Patented Sept. 17, 1940

2,215,142

UNITED STATES PATENT OFFICE 2,215,142

ANTIOXIDANT FOR RUBBER

William D. Wolfe, Cuyahoga Falls, Ohio, assignor to Wingfoot Corporation, Wilmington, Del., a corporation of Delaware No Drawing. Application October 30, 1939,
Serial No. 302,059

12 Claims. (Cl. 260—810)

This invention relates to a method of preserving organic materials subject to deterioration due to oxidation and other influences and to materials so preserved. More particularly, it relates to a method of preserving rubber and to rubber compositions so protected against ageing.

Many chemical compounds and reaction products have been proposed as preservatives for rubber and the like to retard ageing thereof, amino compounds being particularly useful for this purpose. It has now been found that certain reaction products of higher fatty acids and poly hydroxy aromatic compounds also have this valuable property of preserving organic materials to which they are added.

The age registers may be obtained by reacting preferably equimolecular proportions of the poly hydroxy aromatic compound with either an acid halide of a higher fatty acid or with the fatty acid itself. Where the acid halide is employed, the reaction may be carried on at temperatures between about 50° and 125° C., or even higher, but, usually, a temperature between about 90° and 100° C. is preferred. Where the free fatty acid is employed, the foregoing temperatures will not suffice, the free acid being less reactive than its halide, and higher temperatures must be employed. Accordingly, for reaction of the poly hydroxy aromatic compound with a free fatty acid, temperatures ranging from 200° to 300° C. must be used and temperatures from 250° to 300° C. are most effective. Of course, where the reaction is carried on at these higher temperatures, whether the acid or the acid halide is present, a closed vessel will be used to confine the materials and this results in the building up of superatmospheric pressure. Such pressures are incidental to the temperature being maintained and therefore need not be measured.

It is believed that an ester of the acid is formed, water being given off in the case where the free acid is reacted and hydrochloric acid being given off where the halide is reacted. However, the exact composition of the resulting product is not known. It is known, nevertheless, that equimolecular proportions of the hydroxy compound and of the acid halide or of the free acid yield products which are most satisfactory as age resisters or antioxidants, the reaction products of two mols of the fatty acid halide, or of the fatty acid, to one mol of the hydroxy compound yielding products which are not as satisfactory when tested as preservatives. Thus, the age resisters may be obtained by reacting with a poly hydroxy aromatic compound either the free higher fatty acid, the fatty acid halide, such as the chloride or bromide, or other fatty acid derivative capable of reacting with the poly hydroxy aromatic compound to yield the age resisters.

The procedure followed in the preparation of the age resisters is subject to variation but a satisfactory method consists in reacting lauryl chloride, $CH_3(CH_2)_{10}COCl$, with hydroquinone, 16.5 grams, or 0.15 mol, of hydroquinone being mixed with 32.8 grams, or 0.15 mol, of lauryl chloride. The mixture is warmed to induce reaction, which becomes perceptible at 50° C. and very active at 90–100° C. Finally, the mixture is heated to 125–130° C. to drive off all hydrochloric acid formed in the reaction. The residue is a clear liquid when hot and sets to a snow-white solid on cooling, resembling stearic acid in appearance. The yield is 43.8 grams, or 100% of the theoretical, of a solid melting at 66–71° C. It is soluble in warm benzene and gasoline.

The lauryl chloride used in the foregoing example may be prepared from lauric acid and $PCl_5$, the chloride boiling at about 130° C. under 7 mm. pressure.

To the product obtained in the foregoing example may be ascribed the formula $$CH_3(CH_2)_{10}CO-O-C_6H_4OH$$

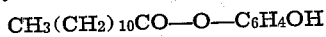

or para hydroxy phenyl laurate, but this formula has not been verified and may not correctly describe the product obtained in the example.

The acid halides of other higher fatty acids may be reacted in similar manner with poly hydroxy aromatic compounds, among such being the acidyl chlorides and bromides of caprylic, pelargonic, capric, myristic, palmitic and margaric acids, as well as the lauryl chloride used in the example. While fatty acids both above and below these in the fatty acid series may yield valuable antioxidants, it is found that best results are obtained with those fatty acids having from 8 to 18 carbon atoms in the molecule and combining in equimolecular ratio when reacted. Other than equal molecular ratios may, of course, be used but, in general, the reaction is mono molecular in result whatever the comparative quantities of reactants initially present.

Other poly hydroxy aromatic compounds can be used in place of hydroquinone, such as pyrocatechol, resorcinol, pyrogallol, phloroglucinol, and hydroxy hydroquinone, although hydroquinone is the preferred compound.

The product obtained in the example given was tested for its age-resisting properties in a representative compound of the following composition:

| | Parts |
|---|---|
| Rubber | 100.0 |
| Zinc oxide | 5.0 |
| Sulphur | 3.0 |
| Hexamethylene tetramine | 1.0 |
| Stearic acid | 1.5 |
| Antioxidant | 1.0 |

After incorporation of the antioxidant in the sample in the amount indicated, the compound was vulcanized and the samples placed in an oxygen bomb at a temperature of 50° C. under a pressure of 150 pounds per square inch for a period of six days. The following results were obtained:

| Cure, °F. | Tensile before oxygen bomb | Tensile after oxygen bomb | T. R. |
|---|---|---|---|
| | | | Percent |
| 35/285 | 97 | 90 | |
| 50 | 110 | 99 | 92 |
| 70 | 116 | 110 | |

It will be noted that the tensile ratio (T. R.) was very good, the tensile strength of the samples after aging being 92% of that before ageing.

The described reaction products can also be used as preservatives in other organic substances, as indicated, such as gasoline, lubricating oils, vegetable oils and the like. Being suitable for rubber, they are also suitable as preservatives in rubber-like materials such as balata, gutta percha, reclaimed rubber, synthetic rubber, latex, etc. and may be associated in the rubber or rubber-like material with other adjuvants customarily added to such materials.

This application is a continuation in part of application Serial No. 145,306, filed May 28, 1937.

While there has been described above the preferred embodiment of the invention, it will be apparent that various changes and modifications may be made therein without departing from the spirit of such invention. Accordingly, the invention is to be limited only by the appended claims in which it is intended to set forth all features of patentable novelty residing therein.

What I claim is:

1. A method of preserving rubber which comprises treating the same with the equimolecular reaction product of a compound from the group consisting of the fatty acids containing from eight to eighteen carbon atoms in the molecule and the acid halides of such fatty acids with a poly hydroxy benzene compound.

2. A method of preserving rubber which comprises treating the same with the equimolecular reaction product of a compound from the group consisting of the fatty acids containing from eight to eighteen carbon atoms in the molecule and the acid halides of such fatty acids with a dihydroxy benzene compound.

3. A method of preserving rubber which comprises treating the same with the equimolecular reaction product of an acid halide of a fatty acid containing from eight to eighteen carbon atoms in the molecule and a poly hydroxy benzene compound.

4. A method of preserving rubber which comprises treating the same with the equimolecular reaction product of an acid halide of a fatty acid containing from eight to eighteen carbon atoms in the molecule and a poly hydroxy benzene compound reacted at a temperature between about 50° and 125° C.

5. A method of preserving rubber which comprises treating the same with the equimolecular reaction product of an acid halide of a fatty acid containing from eight to eighteen carbon atoms in the molecule and a dihydroxy benzene compound.

6. A method of preserving rubber which comprises treating the same with the equimolecular reaction product of an acid halide of a fatty acid containing from eight to eighteen carbon atoms in the molecule and hydroquinone.

7. An age-resisting rubber composition comprising rubber and an equimolecular reaction product of a compound from the group consisting of fatty acids containing from eight to eighteen carbon atoms in the molecule and the acid halides of such fatty acids with a poly hydroxy benzene compound.

8. An age-resisting rubber composition comprising rubber and an equimolecular reaction product of an acid halide of a fatty acid containing from eight to eighteen carbon atoms in the molecule and hydroquinone.

9. An age-resisting rubber composition comprising rubber and an equimolecular reaction product of a fatty acid containing from eight to eighteen carbon atoms in the molecule and a poly hydroxy benzene compound reacted at a temperature between about 200° and 300° C.

10. A method of preserving rubber which comprises treating the same with the equimolecular reaction product of a fatty acid containing from eight to eighteen carbon atoms in the molecule and hydroquinone reacted at a temperature between about 250° and 300° C.

11. A method of preserving rubber which comprises treating the same with the equimolecular reaction product of the acid chloride of lauric acid and hydroquinone.

12. An age-resisting rubber composition comprising rubber and the equimolecular reaction product of lauryl chloride and hydroquinone.

WILLIAM D. WOLFE.